(12) United States Patent
Sarabandi et al.

(10) Patent No.: US 11,018,719 B2
(45) Date of Patent: May 25, 2021

(54) BROADBAND, LOW PROFILE, HIGH ISOLATION, TWO-PORT ANTENNA

(71) Applicant: THE REGENTS OF THE UNIVERSITY OF MICHIGAN, Ann Arbor, MI (US)

(72) Inventors: Kamal Sarabandi, Ann Arbor, MI (US); Seyed M. Amjadi, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 16/876,073

(22) Filed: May 17, 2020

(65) Prior Publication Data

US 2020/0373966 A1 Nov. 26, 2020

Related U.S. Application Data

(60) Provisional application No. 62/850,600, filed on May 21, 2019.

(51) Int. Cl.
| | |
|---|---|
| *H04K 1/10* | (2006.01) |
| *H04L 27/28* | (2006.01) |
| *H04B 3/52* | (2006.01) |
| *H01P 3/10* | (2006.01) |
| *H01P 3/16* | (2006.01) |
| *H04B 3/54* | (2006.01) |

(52) U.S. Cl.
CPC ............... *H04B 3/52* (2013.01); *H01P 3/10* (2013.01); *H01P 3/16* (2013.01); *H04B 3/54* (2013.01)

(58) Field of Classification Search
CPC .... H04B 3/52; H04B 3/54; H01P 3/10; H01P 3/16; H01Q 1/38
USPC .................. 375/220, 260, 377, 295, 316
See application file for complete search history.

(56) References Cited

U.S. PATENT DOCUMENTS

| | | |
|---|---|---|
| 4,733,245 A | 3/1988 | Mussler |
| 4,983,986 A | 1/1991 | Woloszczuk |
| 5,446,471 A | 8/1995 | Chung et al. |

(Continued)

FOREIGN PATENT DOCUMENTS

WO WO-2013141846 A1 9/2013

*Primary Examiner* — Phuong Phu
(74) *Attorney, Agent, or Firm* — Harness, Dickey & Pierce, P.L.C.

(57) ABSTRACT

A broadband, dual-polarized, cavity-backed slot antenna (CBSA) array is presented for enabling full-duplex wireless communication. The antenna consists of a thin rectangular cavity appropriately loaded with metallic septa to excite multiple resonances of similar desired field distribution to achieve consistent radiation characteristics over a wide bandwidth. Four pairs of orthogonal radiating slots are cut out on one of the broad-walls of the cavity; all of which are fed by two orthogonal slots on the opposite broad-wall of the cavity. The cavity is fed by an end-launch coaxial-to-waveguide transition to excite one of the channels. The other channel is excited by a two-pronged microstrip line symmetrically crossing over the other cavity feeding slot. Due to the out-of-phase coupling from the two prongs of the microstrip line to the other port, this type of excitation is shown to provide an unpredicted level of isolation between the two channels over a wide bandwidth.

18 Claims, 11 Drawing Sheets

(56) References Cited

U.S. PATENT DOCUMENTS

| | | | |
|---|---|---|---|
| 6,054,953 A | * | 4/2000 | Lindmark ................ H01Q 1/38 |
| | | | 343/700 MS |
| 6,160,522 A | | 12/2000 | Sanford |
| 6,188,368 B1 | | 2/2001 | Koriyama et al. |
| 6,225,959 B1 | | 5/2001 | Gordon |
| 6,703,983 B2 | | 3/2004 | Huang |
| 8,514,138 B2 | | 8/2013 | Hung et al. |
| 8,629,812 B2 | | 1/2014 | Jaffri et al. |
| 8,648,758 B2 | | 2/2014 | Johnson |
| 10,109,925 B1 | | 10/2018 | Mozaffar et al. |
| 10,483,648 B2 | | 11/2019 | Robinson et al. |
| 2013/0293424 A1 | | 11/2013 | Zhu et al. |

* cited by examiner $L = 1,3 \lambda_L$　$H = 0.15 \lambda_L$

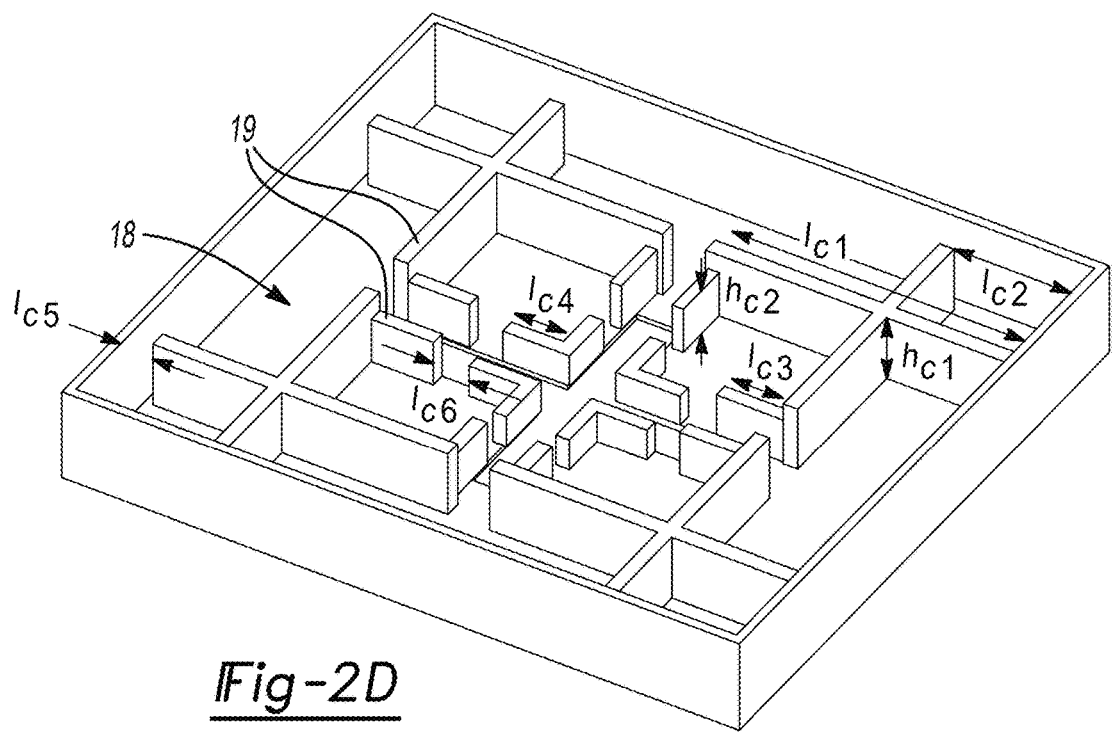
Fig-2D
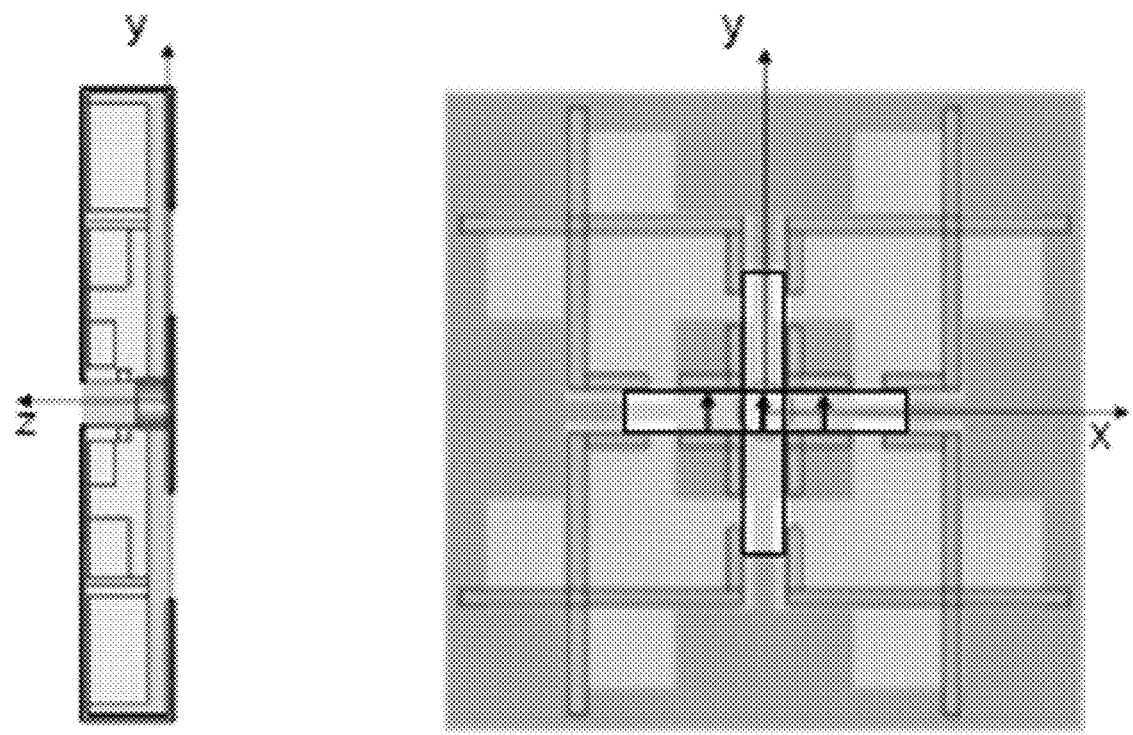
Fig-3A
Fig-3B

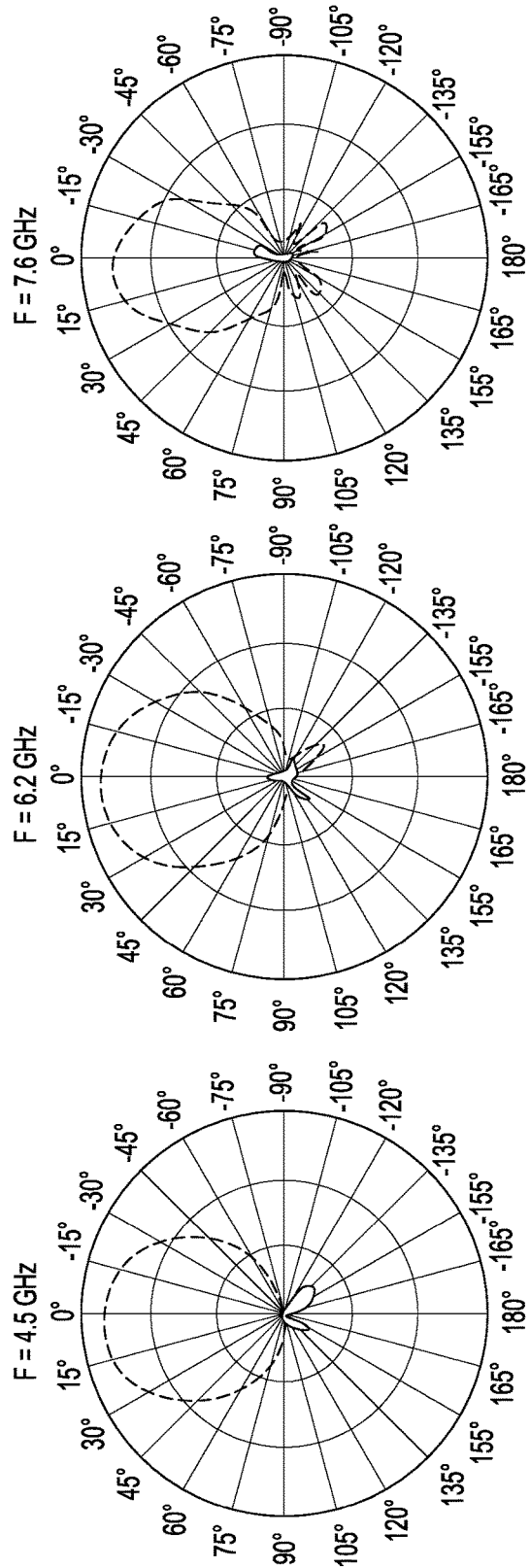
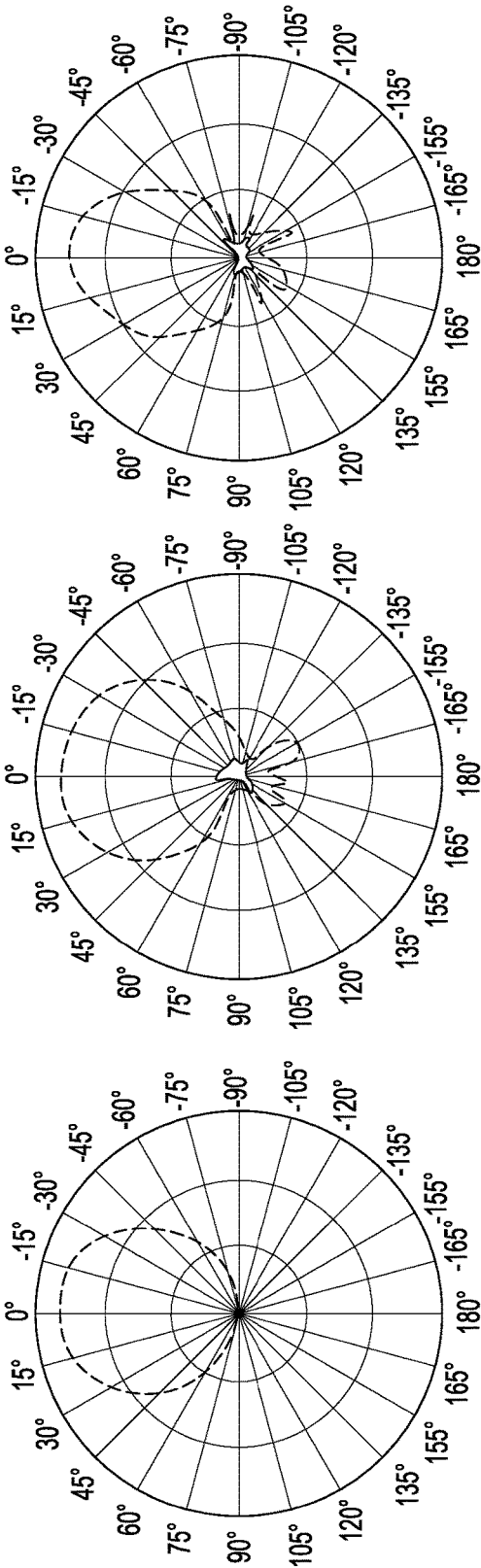

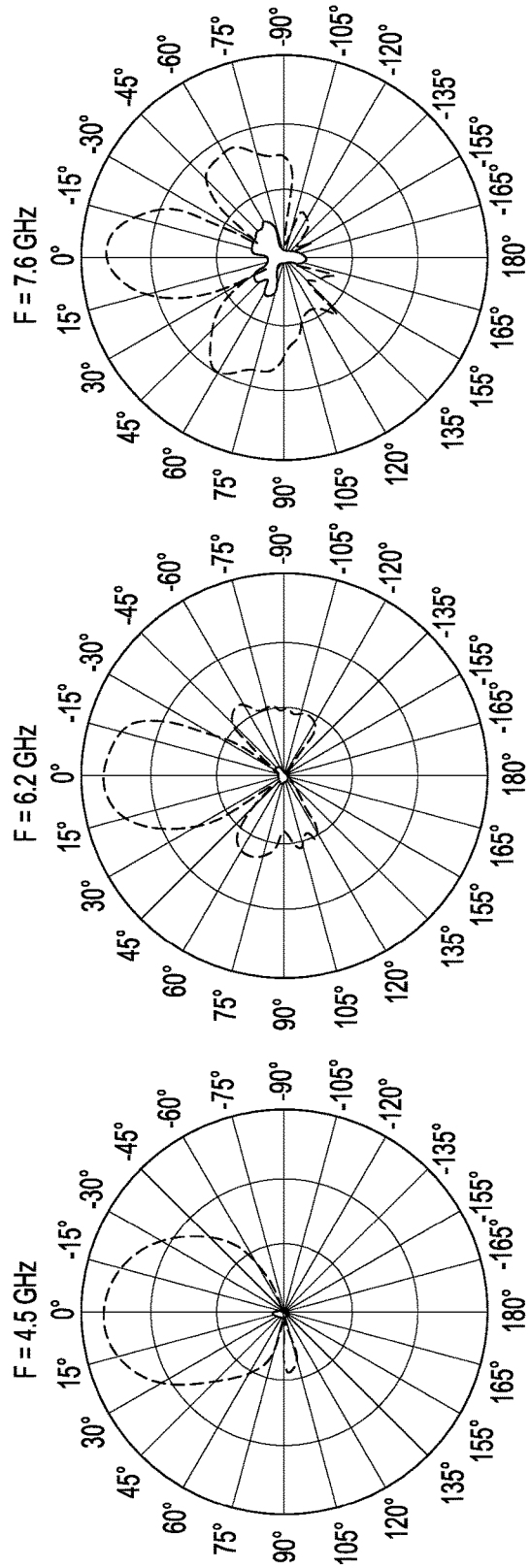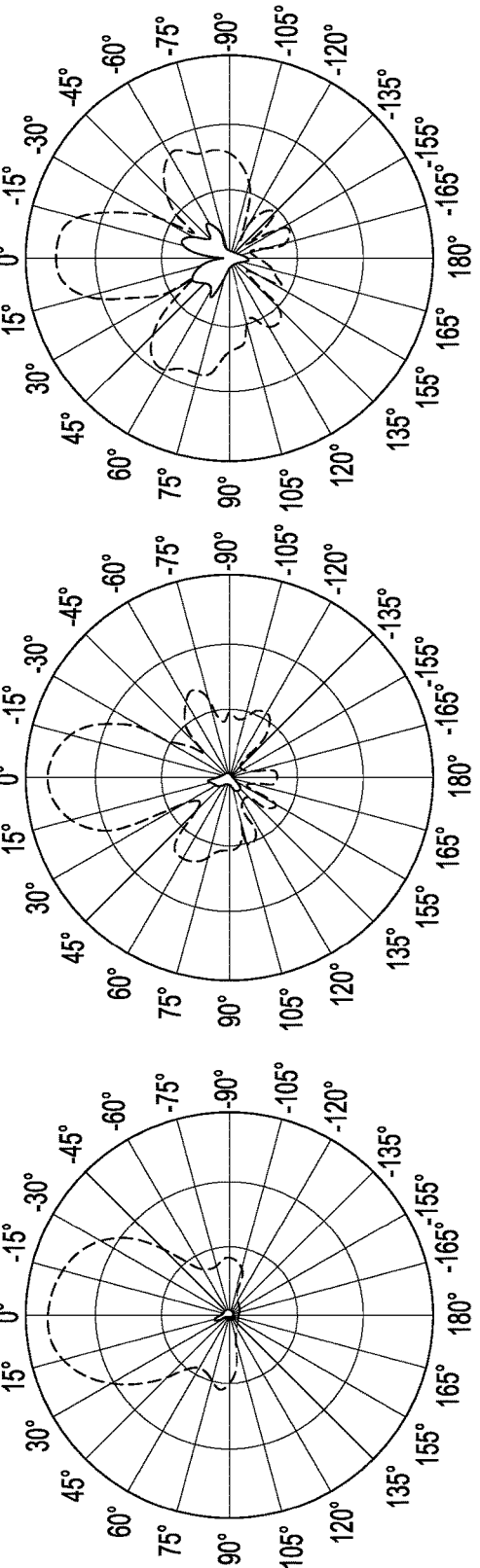

BROADBAND, LOW PROFILE, HIGH ISOLATION, TWO-PORT ANTENNA

CROSS-REFERENCE TO RELATED APPLICATION

This application claims the benefit of U.S. Provisional Application No. 62/850,600, filed May 21, 2019. The entire disclosure of the above application is incorporated herein by reference.

FIELD

The present disclosure relates to broadband, low profile, high isolation, two-port antenna.

BACKGROUND

The ever-increasing demand for wireless communications arising from the emerging technologies such as the Internet of Things (IoT) has put stringent conditions on the efficient use of the available frequency spectrum. The traditional approaches for enhancing the spectral efficiency of wireless systems such as advanced modulation methods, advanced coding, and Multiple Input Multiple Output (MIMO) techniques have been fully expended. The predicted increase in spectral efficiency using MIMO concept is based on unrealistic expectations that the channel matrix has full rank. However, the capacity gain of MIMO channels is limited in real operating scenarios due to erroneous channel estimation particularly in time-varying and low SNR channels and high level of channel fading correlation as the size of the MIMO system gets large. As the aforesaid methodologies for enhancing the channel capacity reach their maximum potential, alternatives must be created to push the limits not by discarding the foregoing achievements but by building on them. One of the possible solutions to be integrated with MIMO to meet the challenges of the future ultra-dense networks is to replace the current prevalent time-division and frequency-division duplex transceivers with full-duplex transceivers. In contrast to the former in which transmitting and receiving are operated either at different times or over different frequencies, full-duplex transceivers are designed to transmit and receive data at the same time and over the same frequency band resulting in a twofold increase in the channel capacity of the system. Enabling full-duplex operation using orthogonal polarizations has two advantages: 1) facilitating channel estimation as the size of the channel matrix becomes smaller and 2) reducing system complexity through reducing the number of required transmitters and receivers.

Operating in full-duplex, however, requires perfect self-interference suppression which has been extensively studied recently. Self-interference refers to the strong signal coupling from the transmitter to the co-located receiver whose level is much larger than the desired received communication signal to be detected. The required level for interference cancellation depends on the level of the transmitted signal. Assuming 0 dBm for the transmitted power and ~−100 dBm for the noise floor (~20 MHz Bandwidth), a scheme that can suppress the level of the interference signal beyond 100 dB is required. Different cancellation approaches have been reported to achieve such high level of cancellation.

Three main techniques and combination of them may be employed for this purpose including analogue cancellation, digital cancellation, and antenna cancellation methods. Analogue cancellation is performed based on the measured transfer function from Tx to Rx using an RF circuitry. This RF circuit consists of a coupler which picks up a copy of the transmitted signal and passes it through a gain stage and a phase shift stage. The gain and the phase shift are adjusted such that the output of the RF circuit is equal in magnitude and out of phase with the leaked signal from Tx to Rx. This signal is then injected to the receiver to achieve partial suppression of the interference signal. Practical RF cancellation circuits are reported to provide about 25 dB cancellation level. Likewise, digital cancellation may be envisioned after Analogue to Digital Convertor (ADC) module using different techniques such as successive interference cancellation and Zig Zag decoding. However, the sum of analogue and digital cancellation level based on these two methods cannot exceed 50 dB. An additional cancellation mechanism which will be referred to as antenna cancellation is, therefore, suggested to enable full-duplex operation.

This section provides background information related to the present disclosure which is not necessarily prior art.

SUMMARY

This section provides a general summary of the disclosure, and is not a comprehensive disclosure of its full scope or all of its features.

A two-port cavity-backed slot antenna is presented. The antenna includes: an antenna structure having shape of a cuboid and defining a cavity therein; a feed slot formed in a first of two opposing planar surfaces of the antenna structure; and one or more radiating slots formed in a second of the two opposing planar surfaces of the antenna structure. In one example, the feed slot is in the shape of a cross and comprised of a transmit slot and a receive slot. The one or more radiating slots are arranged symmetrically in relation to the feed slot. In one example, the one or more radiating slots are further defined as four radiating slots, where each radiating slot of the four radiating slots are in shape of a cross and the arms of each cross have same dimensions.

The antenna further includes a microstrip configured to deliver a transmit signal to the transmit slot. The microstrip includes two prongs symmetrically crossing over the transmit slot with one of the two prongs on each side of the receive slot. Portions portions of the two prongs overlapping with the transmit slot are preferably suspended in air.

In some embodiments, a plurality of metal septa disposed in the cavity of the antenna structure and arranged along edges of the transmit slot and the receive slot. Additional metal septa may be disposed in corners of the cavity of the antenna structure and configured to generate a standing wave at higher frequencies of the operating bandwidth.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A, 2B and 2D depict a front side, a back side and an inside view, respectively, of the proposed cavity-backed slot antenna.

FIGS. 3A and 3B are a side view and a front view, respectively, of the proposed cavity-backed slot antenna;

FIG. 12A-12C show the measured radiation patterns for V-pol H-plane at three different frequencies;

FIGS. 13A-13C show the measured radiation patterns for H-pole H-plane at three different frequencies;

FIGS. 14A-14C show the measured radiation patterns for V-pole E-plane at three different frequencies;

FIGS. 15A-15C show the measured radiation patterns for H-pole E-plane at three different frequencies;

Corresponding reference numerals indicate corresponding parts throughout the several views of the drawings.

DETAILED DESCRIPTION

Example embodiments will now be described more fully with reference to the accompanying drawings.

This disclosure introduces a compact, broadband, and common aperture slot antenna with high level of isolation between the two ports over 44% fractional bandwidth. The proposed antenna does not require any quadrature or out-of-phase hybrid. The devised antenna provides higher gain for both channels compared to previously reported full-duplex antennas as both channels share the entire available aperture. Other than polarization, the transmitting and receiving radiation patterns are of the same shape.

Figure 1:
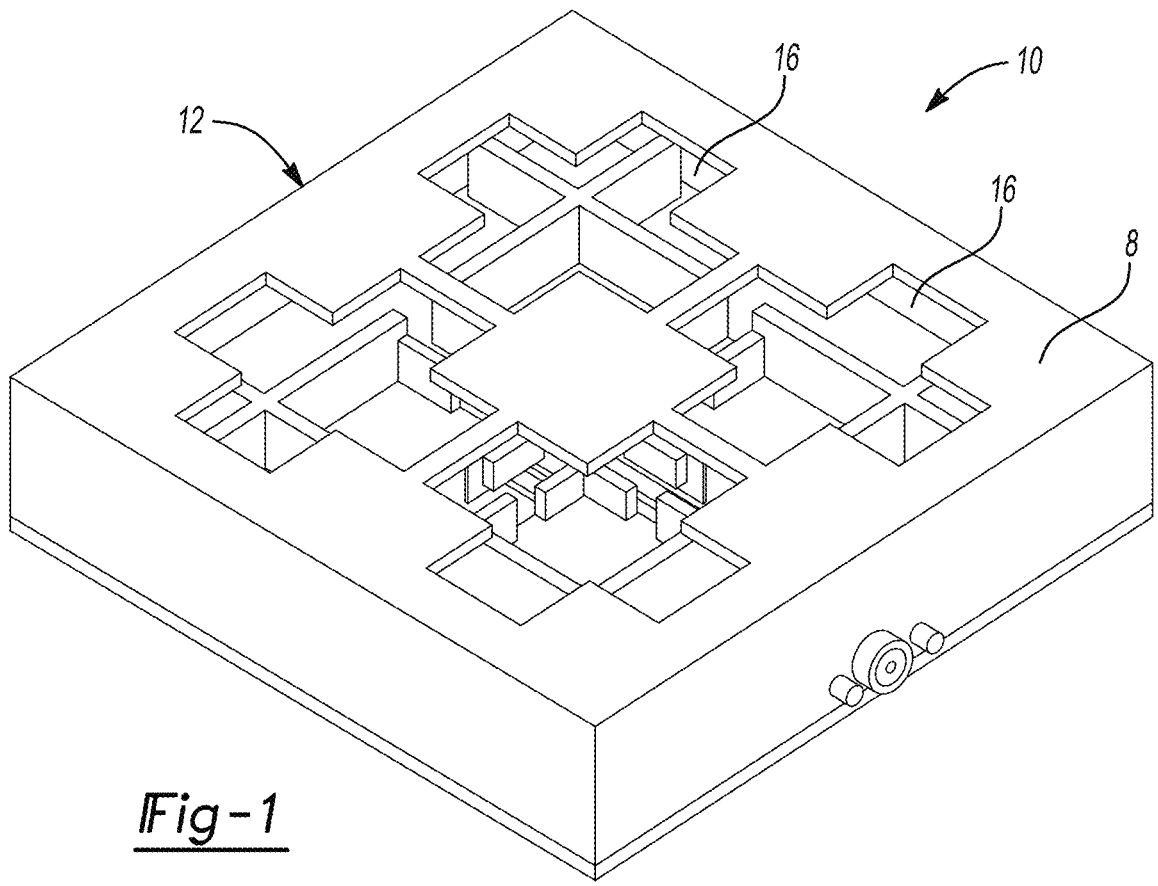
FIG. 1 is a perspective view of the proposed cavity-backed slot antenna.
Figure 2A:
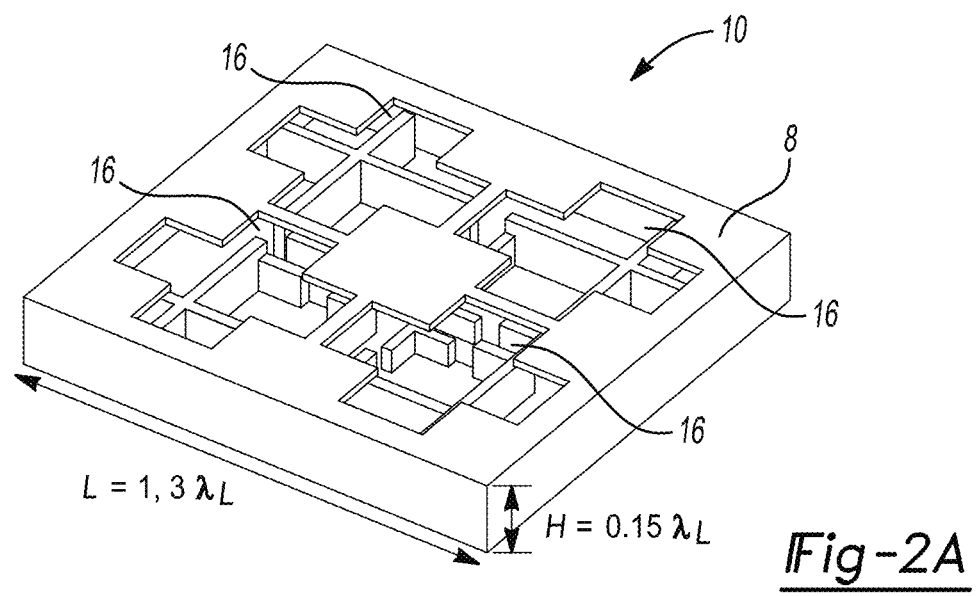
Figure 2B:
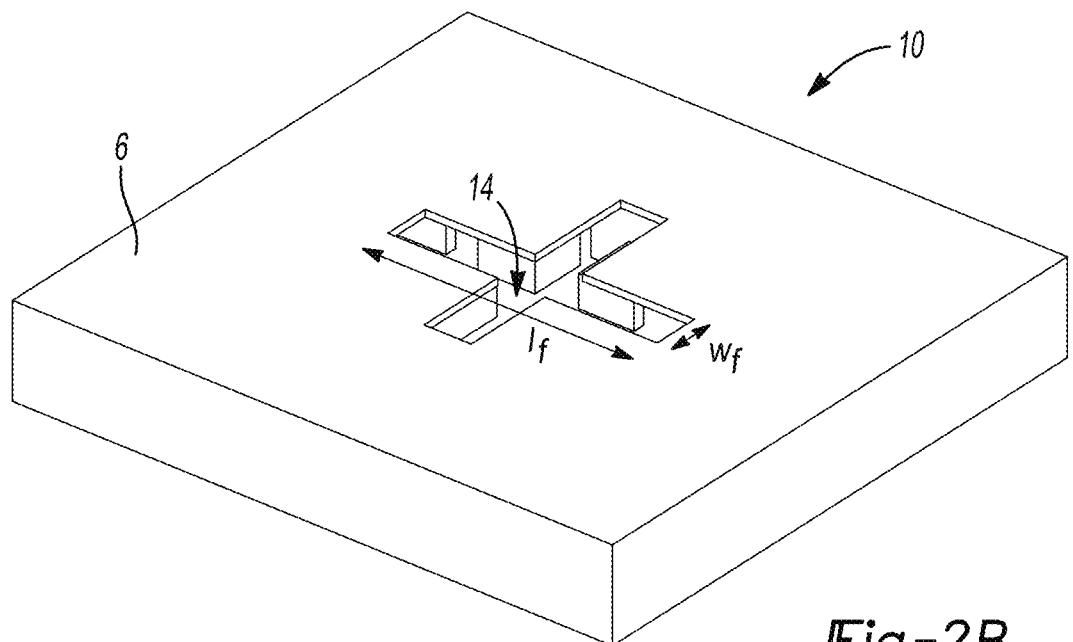

With reference to FIGS. 1 and 2A-2D, an example embodiment of the cavity-backed slot antenna 10 is described. The antenna 10 is comprised of an antenna structure 12 having shape of a rectangular cuboid. A feed slot 14 is formed in a first of two opposing planar surfaces 6,8 of the antenna structure 12 as best seen in FIG. 2B. The feed slot 14 has shape of a cross and is comprised of a transmit slot and a receive slot. A microstrip is configured to deliver a transmit signal to the transmit slot as will be further described below. In the example embodiment, the microstrip includes two prongs symmetrically crossing over the transmit slot with one of the two prongs on each side of the receive slot as further described below.

One or more radiating slots 16 are formed in a second of the two opposing planar surfaces of the antenna structure 12 as best seen in FIG. 2A. The one or more radiating slots are arranged symmetrically in relation to the feed slot. In this example, the antenna 10 include four radiating slots and each radiating slot is in shape of a cross although other shapes are envisioned for the slots. More specifically, the arms of each cross have same dimensions and the longitudinal dimension of each radiating slot is about $\lambda/2$, where $\lambda$ corresponds to operating frequency of the antenna. In another example, the antenna may include only one radiating slots. More or less radiating slot are contemplated in other embodiment.

Figure 2C:
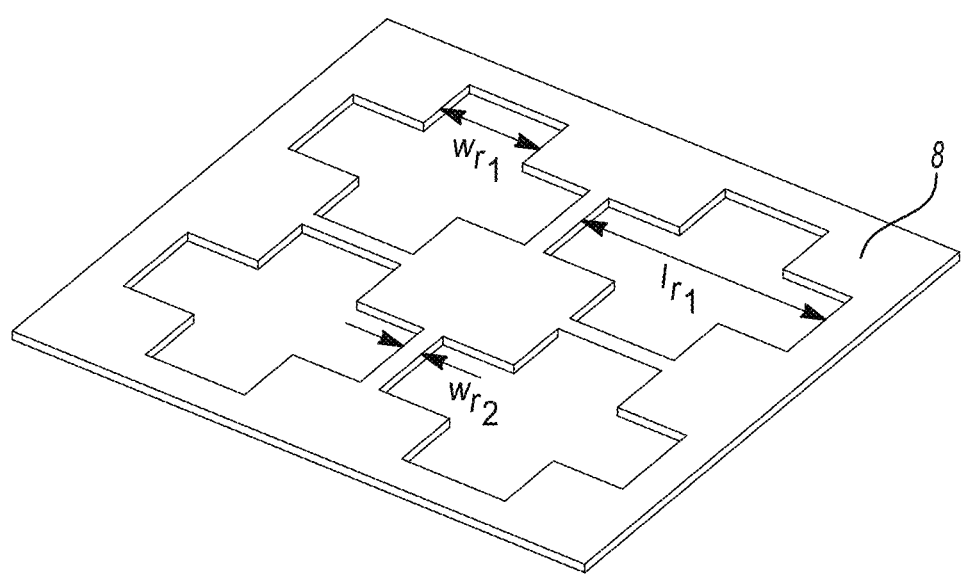
FIG. 2C depicts an inside cavity of the proposed cavity-backed slot antenna.

Referring to FIG. 2C, the antenna 10 is composed of an especial rectangular slotted cavity 18 which is commonly exploited by both channels. In the example embodiment, the cavity height $H=0.15\lambda_L$. The antenna further includes a microstrip circuitry and an end-launch coaxial-to-waveguide transition with orthogonal polarizations. Each of these components feed the cavity. While being compact, the feeding topologies are designed using a symmetric geometry which provides high level of self-interference cancellation over a wide bandwidth. The following sections describe the principle of operation of these three integrated parts of the antenna.

A cavity-backed slot aperture acts like a narrowband radiator by its nature. It has been shown that it is feasible to make a slotted cavity radiate over a wide bandwidth by appropriately loading the cavity by multiple metallic septa 19. The inserted septa increases the bandwidth through two different mechanisms. First, the septa excite evanescent modes and thus bring down the cutoff frequency. Second, the septa can be designed to merge different resonant frequencies. As a result, the modified slotted cavity exhibits broadband behavior. This cavity acts as a transducer between the wideband feed ports and the radiating aperture by properly tailoring the field distribution. Devised to have four cross-slots on the broad wall as common radiating elements for both transmit and receive channels, the cavity is fed by two perpendicular slots on the back wall to generate orthogonal transmit and receive polarizations.

In the example embodiment, a first series of metal septa are disposed in the cavity of the antenna structure and arranged along edges of the transmit slot and the receive slot. Additional metal septa disposed in corners of the cavity of the antenna structure. These additional metal septa are designed to generate a standing wave at higher frequencies of the operating bandwidth. The provision of these septa will allow formation of proper standing wave over the radiating slots which in turn facilitates radiation.

With reference to FIGS. 3A and 3B, for vertical polarization, the electric field distribution across the feeding slot resembles that of the $TE_{10}^z$ field distribution for a rectangular waveguide, i.e., $E=\hat{y}E_y(x)$. As the wave propagates into the cavity, a component of the electric field is generated in z-direction due to the discontinuity between the feeding slot and the cavity. Thereby, the excited mode inside the cavity is $TE^x$. Solving the wave equation for the magnetic hertz vector potential $\Pi_{ms}$, inside the cavity, one has:

$$E = i\omega\mu\nabla\times\Pi_m \quad (1)$$

and the vertical component of the electric field is simply obtained as $$E_y = i\omega\mu\frac{\partial \Pi_{mx}}{\partial z} \quad (2)$$

The discontinuity of the magnetic Hertz vector potential at the edges of the septa results in non-vanishing electric field in y-direction. This suggests that the metallic septa should be placed close to the edges of the slots as shown in FIG. 2C to excite a component of the electric field in y-direction across the radiating and feeding slots. While reducing the cutoff frequency of the cavity, this arrangement of the septa assists with wave transformation from $TE_{10}^z$ to $TE^x$ and excites multiple $TE^x$ resonances of the slotted cavity. Similar mechanism holds true for the horizontal polarization. Hence, the proposed compact slotted cavity radiates over a wide bandwidth.

Figure 4:
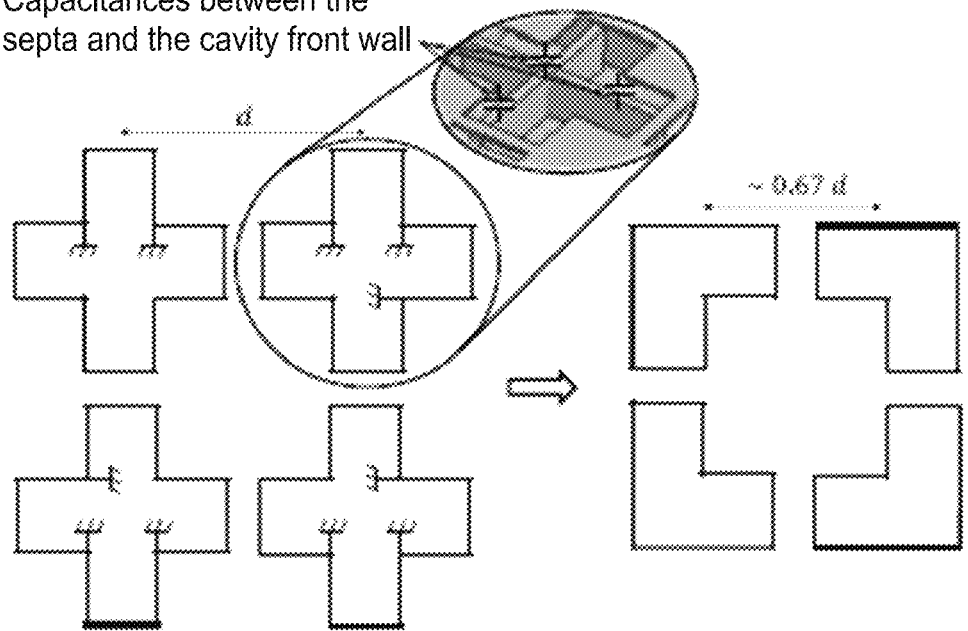
FIG. 4 is a diagram showing the mechanism of shrinking the slots size by appropriately placing the septa.

As frequency increases, the electrical distance between radiating slots increases. This can introduce a deteriorating effect on the radiation pattern and gain through increasing the level of the grating lobes. Appropriately placed, the inserted septa can be exploited to rectify this problem to some extent. Referring to FIG. 4, the reactance due to the capacitance between the edges of the septa and the broadwall of the cavity decreases as frequency increases. This leads to semi-short-circuiting part of the slot towards the slot edge and thereby reducing the effective length of the slots. The reduction in the center to center distance between the two radiating slots causes the level of the grating lobes to drop.

Figure 5:
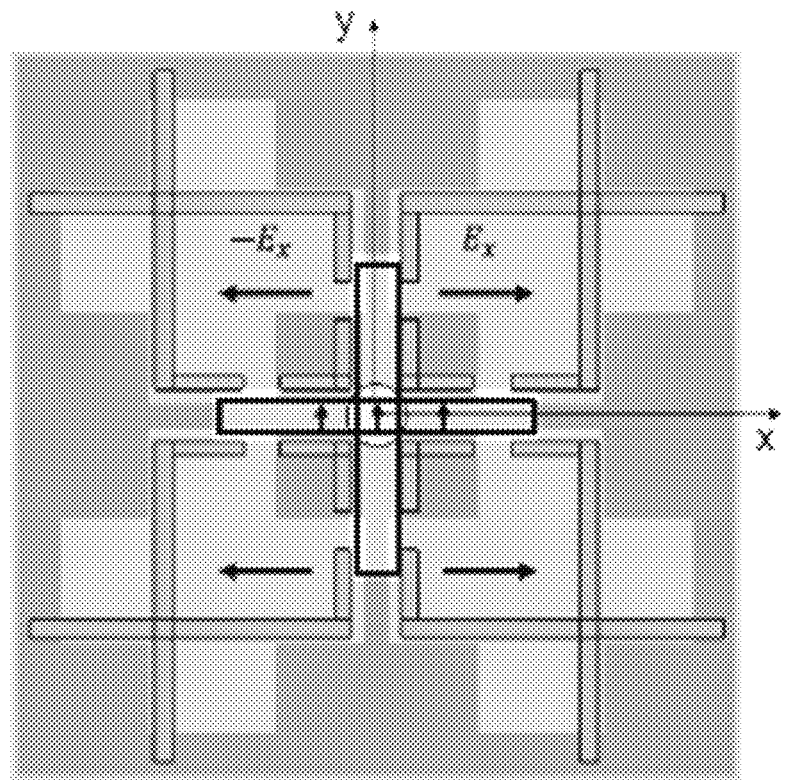
FIG. 5 is a diagram showing the cross polarized radiation caused by the cross polarized electric field generated across each slot is cancelled by that of the adjacent slot within the main beam due to the structure symmetry.

Each radiating slot bears some level of cross-polarized radiation. However, the symmetric geometry of the structure allows for cancellation of the cross-polarized radiation within the main beam. FIG. 5 shows the schematic of the generated cross-polarized electric field across each slot. The symmetry requires the undesired cross-polarized components of the electric field of the adjacent slots to be in opposite directions, hence the far-field cross-polarized radiation is very low around the direction of the peak gain ($\theta=0$). There is still some level of cross-polarization in directions away from the main beam.

Figure 6:
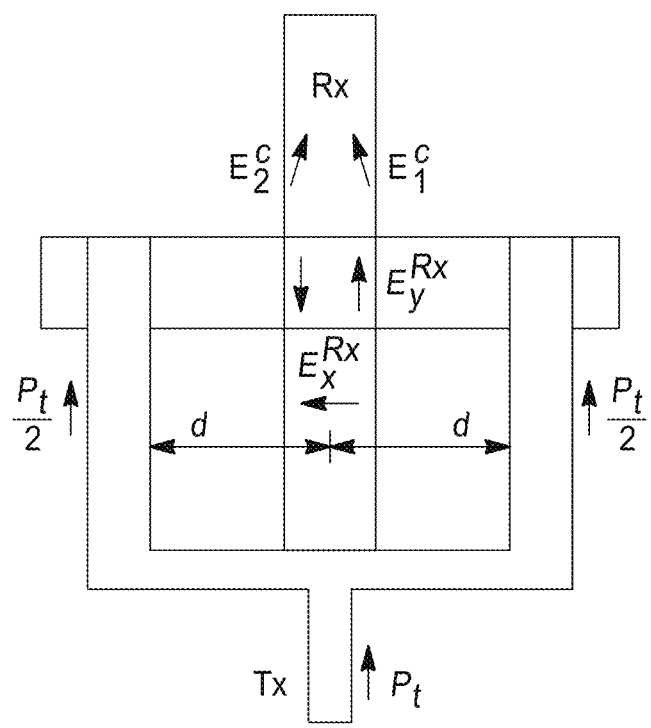
FIG. 6 is a schematic of an example feeding topology, where the coupling between channels due to depolarization represented by $E_r$, is significantly reduced by this method.

Using orthogonal polarizations for transmit and receive channels, does not provide the required level of isolation. This is mainly due to depolarization of the wave as it propagates from Tx through the antenna structure. The depolarized wave is then partly captured by the Rx. To achieve higher level of self-interference cancellation, a symmetric feed configuration is employed. The schematic of the decoupling method is shown in FIG. 6. The feed slot is comprised of a transmit slot 64 and a receive slot 65. Two orthogonal rectangular slots which form a cross are used to feed the cavity each of which excites one polarization. The slot with vertical polarization (transmit slot 64 in FIG. 6) is fed by a two-pronged microstrip 61 symmetrically crossing over the transmit slot 64. It is noted that the portions of the two prongs overlapping with the transmit slot are suspended in air. The coupled signals from the two prongs 62, 63 of the microstrip 61 to the waveguide slot with horizontal polarization (receive slot in FIG. 6) due to polarization transformation are equal in magnitude and out-of-phase resulting in a high level of decoupling between the two ports. The symmetry mandates that the coupled electric field generated by the two prongs of the microstrip line of the Tx port over the Rx slot denoted by $E_1^c(x,y)$ and $E_2^c(x,y)$ satisfy the following conditions:

$$E_{1x}^c(x,y) = -E_{2x}^c(-x,y) \quad (3)$$

and $$E_{1y}^c(x,y) = E_{2y}^c(-x,y) \quad (4)$$

To ensure the coupled field at the Rx slot would be cancelled, reciprocity can be used. That is by exciting the Rx slot, the field over the Rx slot aperture must satisfy the following conditions:

$$E_x^{Rx}(x,y) = E_x^{Rx}(-x,y) \quad (5)$$

and $$E_y^{Rx}(x,y) = E_y^{Rx}(-x,y) \quad (6)$$

It will be shown that it is feasible to generate such electric field distribution by a compact broadband coaxial to waveguide transition which is connected to the Rx slot. The cancellation level achieved by this method is frequency-independent, such that the bandwidth of the structure is limited by the bandwidth of each channel not the bandwidth provided by the cancellation mechanism. This structure allows for sharing the entire available aperture by both channels and thereby, provides at least 3 dB higher gain or half area used by the antenna system compared to other reported full-duplex antenna systems in which separate elements are used for transmitting and receiving. The realization of the microstrip and waveguide feeds are described later in this disclosure.

Figure 7:
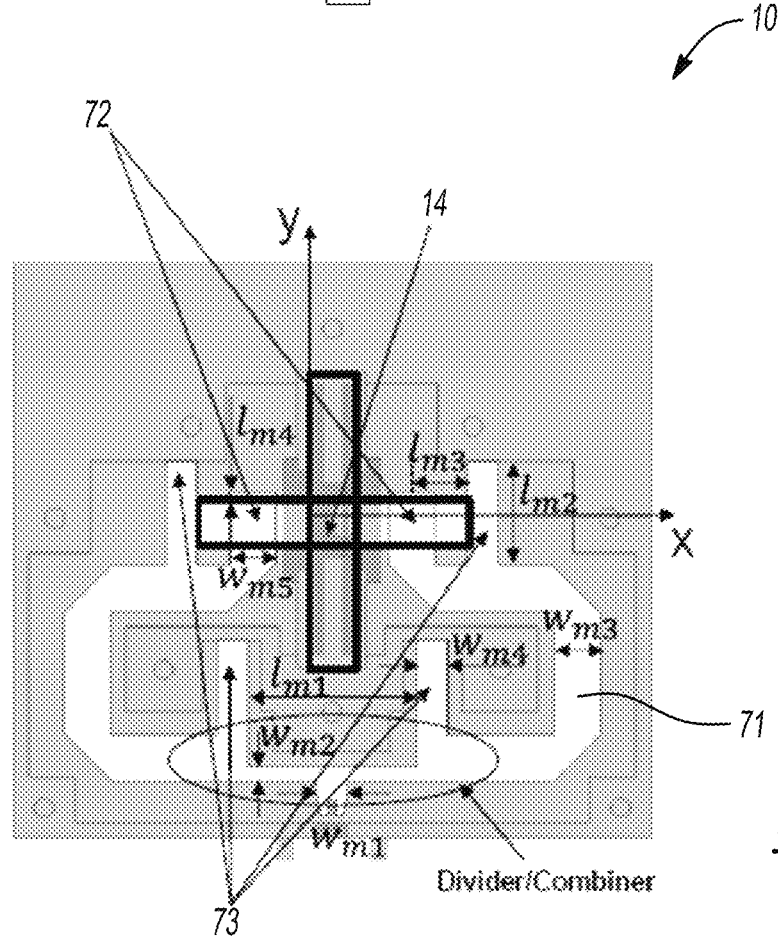
FIG. 7 is a diagram showing the microstrip feed laid out on the back side of the cavity.

In one embodiment, the microstrip feed line 71 is laid out on the back side of the cavity as depicted in FIG. 7. It is composed of an equal-power divider, two open circuited lines 72 crossing the feeding slot 14 of the cavity, and four short-circuited quarter-wavelength stubs 73. The reason for adding the stubs is to realize the microstrip lines on air dielectric to reduce loss and dispersion. The air-dielectric microstrip line can be fabricated with the cavity as a single unit using 3D printing technology. This method has also the advantage of eliminating issues with aligning and assembling the microstrip board with the cavity if the microstrip is fabricated separately by standard Printed Circuit Board (PCB) technology. To make this feasible, the microstrip line should be of relatively large thickness that also helps reduce the conductor loss. Eliminating substrate loss, the air-dielectric microstrip line does not support surface wave and thereby, does not suffer from surface wave loss.

Figure 8:
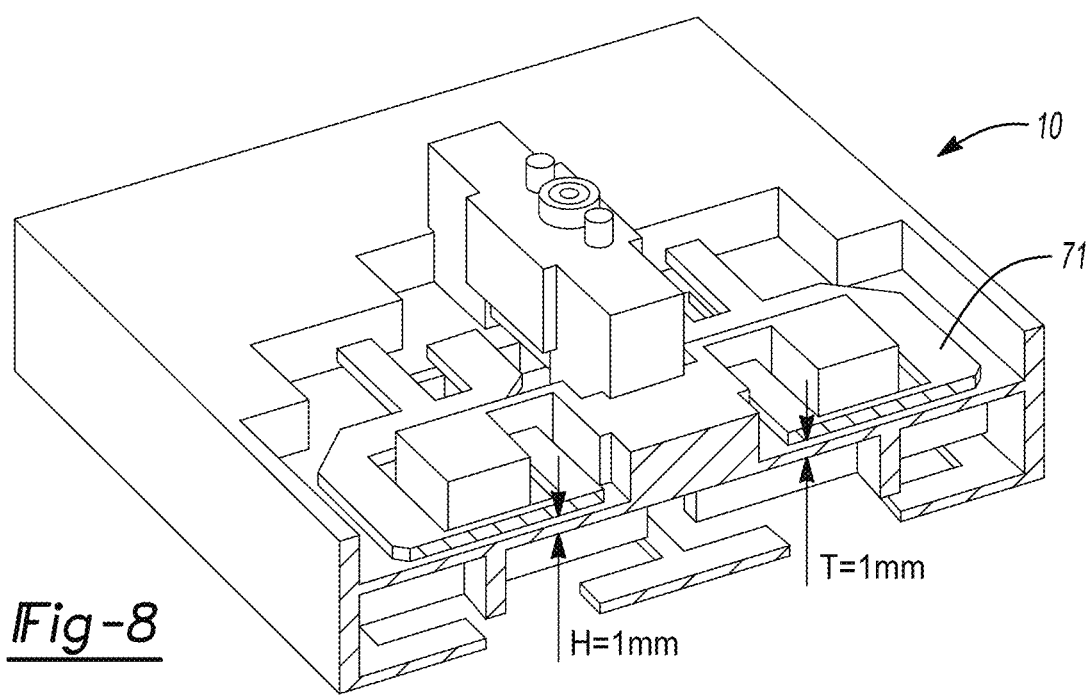
FIG. 8 is a perspective cut view of the air-dielectric microstrip line suspended over ground plane and supported by quarter-wavelength stubs short-circuited to the antenna body to provide the mechanical support.

A perspective view of the microstrip feed 71 is shown in FIG. 8. In this embodiment, the lines have a thickness of T=1 mm and are suspended at a distance of H=1 mm from the group plane (back side of the cavity). This low-loss air-dielectric microstrip feed is supported by four quarter-wavelength stubs short-circuited to the antenna body and is amenable to 3D printing technology. The feed lines cross the slot at a distance of $l_{m3}=0.15\lambda_0$ from the slot lateral sides where $\lambda_0$ is the wavelength at the center frequency and are open-circuited at a distance slightly above the upper longitudinal side of the slot ($l_{m4}$ in FIG. 7). The stubs are designed to be oriented in y-direction to minimize creating cross-polarized radiation which may be coupled to the other port.

Figure 9:
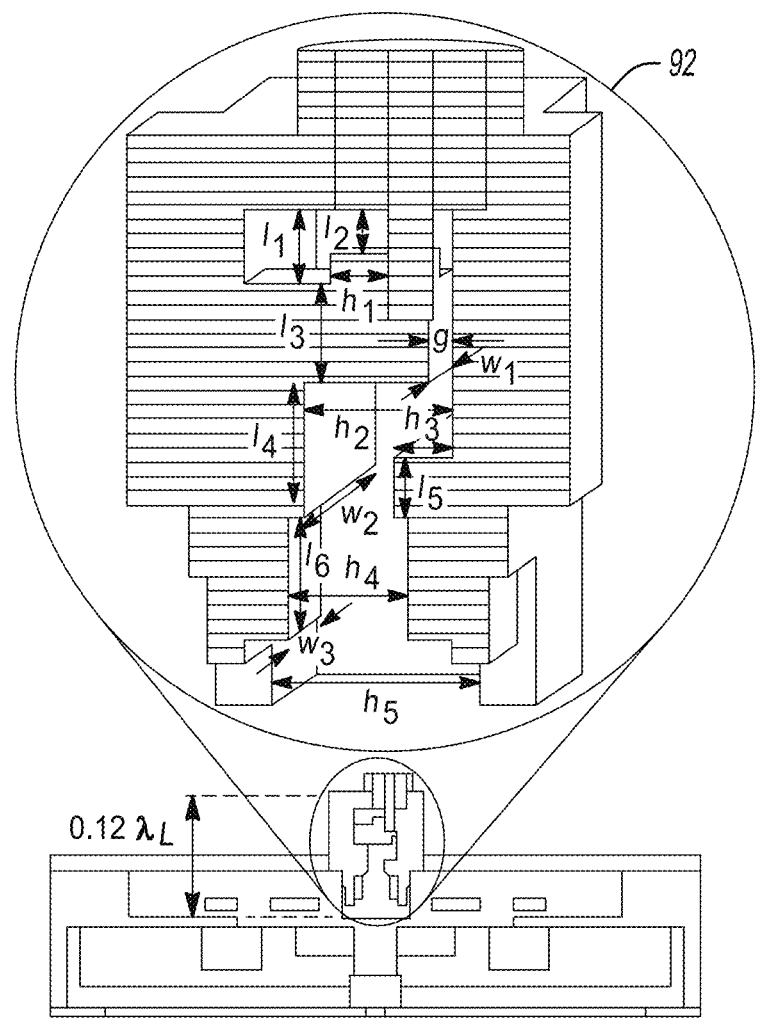
FIG. 9 illustrates an example of the coaxial-to-waveguide transition feeding the cavity.

To achieve a high level of isolation, the electric field across the Rx slot should satisfy (5) and (6). To create this electric field, a compact end-launch coaxial-to-waveguide transition is devised. An example embodiment of a suitable structure of the transition is shown in FIG. 9. The transition is composed of multiple waveguide sections that provide impedance matching and field transformation between the coaxial line and the feeding slot. As the TEM wave on the coaxial line with the radial electric field between the inner and the outer conductor propagates through the waveguide 92, a component of the electric field in x-direction survives through the small gap of the A-D section of the waveguide. Other components of the electric field are bypassed to a great extent through the hollow-like part of A-C section. The cross section of the waveguide in x-direction is then gradually increased to match the width of the feeding slot. The established electric field in the small gap propagates through four waveguide sections extending from z=D to z=H. The waveguide is supported by quadruplet pillars protruded along the edge of the aforesaid feeding slot. This design renders a symmetric distribution for the x-component of the electric field across the waveguide aperture at z=H. The x-component of the electric field is symmetric, and the y-component of the electric field is antisymmetric with respect to the center of the slot, thereby conditions (5) and (6) are met. At the microstrip terminal the surface current given by $J_s = z \times H_t$ is very small resulting in a very high isolation between the two ports.

Figure 10A:
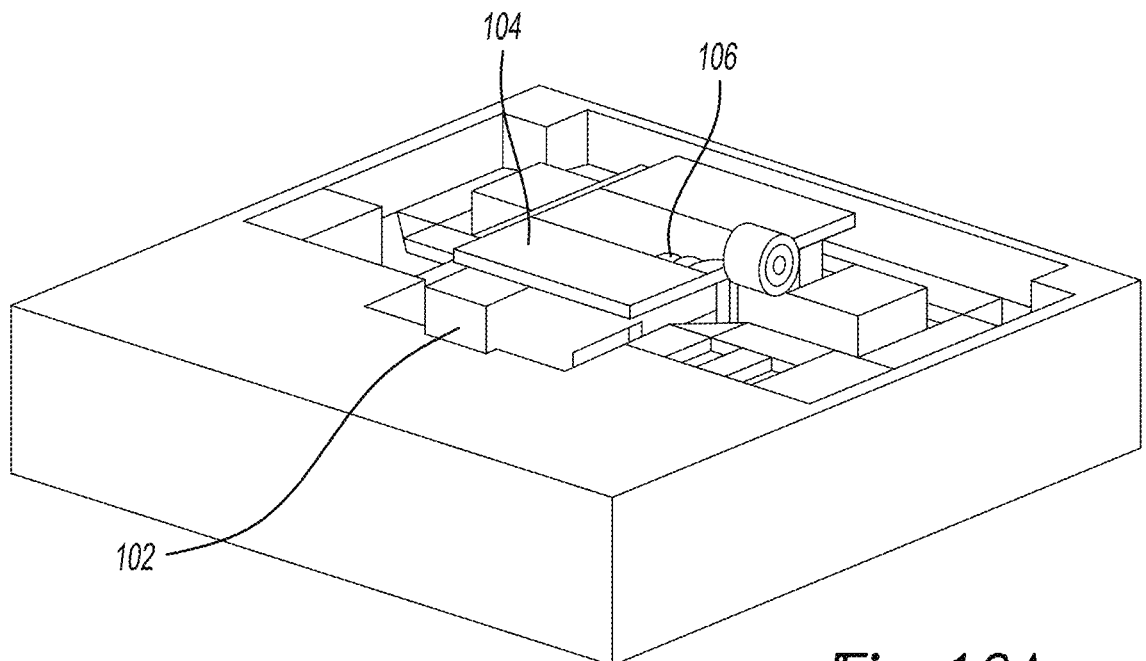
FIGS. 10A and 10B are a perspective view and a cross-sectional view, respectively, of an alternative feed topology for the antenna.
Figure 10B:
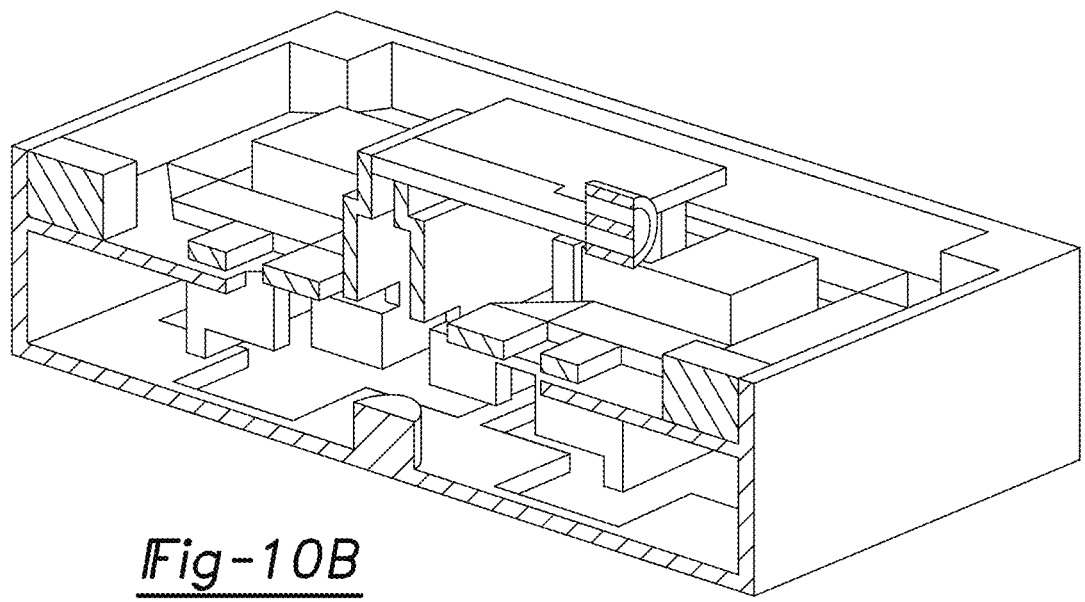

Because the transition shown in FIG. 9 is a very complex structure, an alternative feed topology 102 is shown in FIGS. 10A and 10B. This feed configuration is composed of a rectangular waveguide section feeding the cavity, an air-dielectric parallel plate waveguide transmission line, and parallel strip lines. The waveguide section is transitioned to a parallel plate transmission line with a plate spacing smaller than the narrow width of the waveguide opening. The parallel plate line is then stepped transitioned to a parallel strip lines section which is in turn connected to a coaxial connector. The design parameters including the length and the height of the air-dielectric parallel plate waveguide and the parallel strip lines are optimized by full-wave simulations for the desired bandwidth. Designed for the same bandwidth, this structure is less complex but provides a lower level of isolation compared to the design shown in FIG. 9.

Simulation and experimental results of the proposed antenna are presented as proof of concept. The proposed complex antenna structure shown in FIG. 8 is fabricated using HP PA12 Nylon 3D printing and then silver metallization by spraying. The optimized values of the parameters for the cavity, microstrip feed, and waveguide feed are listed in Table 1, Table 2, and Table 3 respectively.

TABLE I

Dimensions of the cavity shown in FIG. 2

| Parameter | Value(MM) | Parameter | Value (mm) |
|---|---|---|---|
| H | 11 | $h_{c1}$ | 7.6 |
| L | 83 | $h_{c2}$ | 5.4 |
| $w_{r1}$ | 13.6 | $l_{c1}$ | 35.1 |
| $w_{r2}$ | 2.6 | $l_{c2}$ | 13.5 |
| $l_{r1}$ | 33 | $l_{c3}$ | 7.6 |
| $w_{f1}$ | 5.6 | $l_{c4}$ | 7.6 |
| $h_{f1}$ | 35.4 | $l_{c5}$ | 1.6 |
| | | $l_{c6}$ | 4.2 |

TABLE II

Dimensions of the microstrip feed shown in FIG. 7

| Parameter | Value (MM) | Parameter | Value (mm) |
|---|---|---|---|
| $w_{m1}$ | 4 | $l_{m1}$ | 22 |
| $w_{m2}$ | 2 | $l_{m2}$ | 13.6 |
| $w_{m3}$ | 6 | $l_{m3}$ | 7.4 |
| $w_{m4}$ | 4 | $l_{m4}$ | 0.9 |
| $w_{m5}$ | 6 | | |

TABLE III

Dimensions of the waveguide feed shown in FIG. 9

| Parameter | Value (MM) | Parameter | Value(mm) |
|---|---|---|---|
| $h_1$ | 1.2 | $l_1$ | 12 |
| $h_2$ | 4 | $l_2$ | 1.2 |
| $h_3$ | 1.6 | $l_3$ | 2.7 |
| $h_4$ | 4 | $l_4$ | 3.7 |
| $h_5$ | 5.1 | $l_5$ | 1.7 |
| $w_1$ | 10 | $l_6$ | 3.3 |
| $w_2$ | 35.4 | g | 0.6 |
| $w_3$ | 35.4 | | |

Figure 11A:
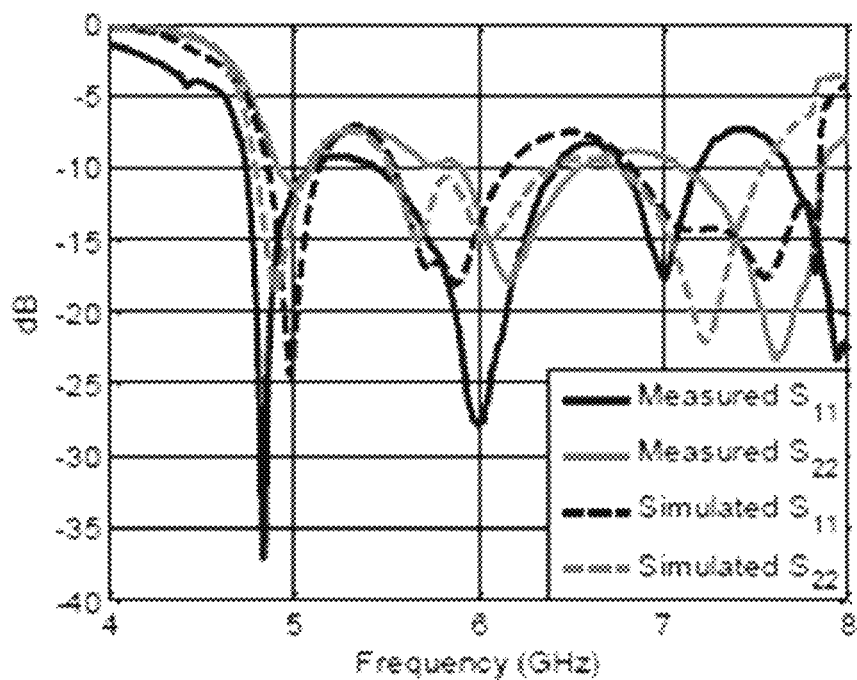
FIGS. 11A and 11B are graphs showing the simulated and measured S-parameters, respectively.
Figure 11B:
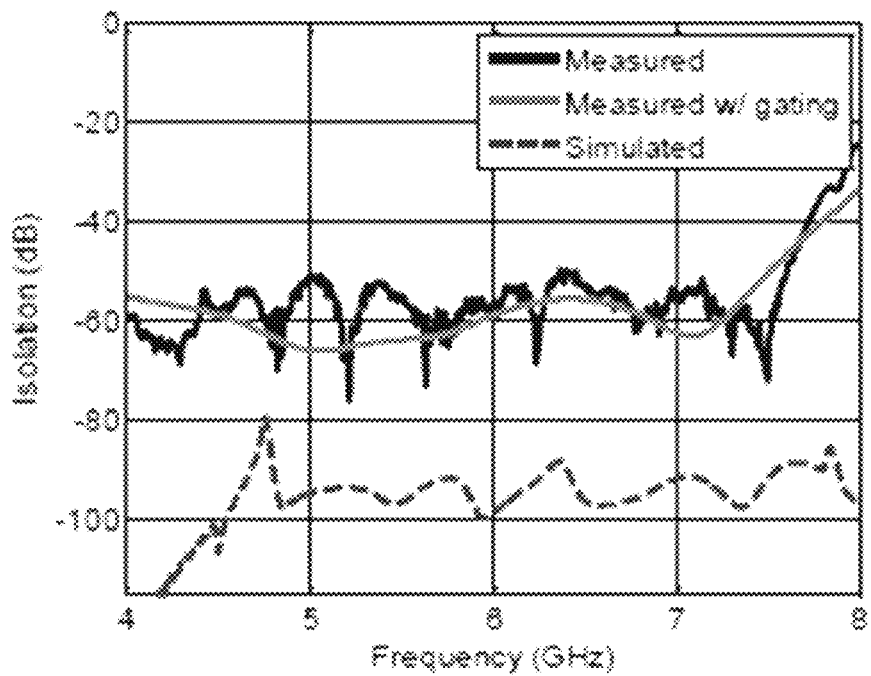
Figure 16:
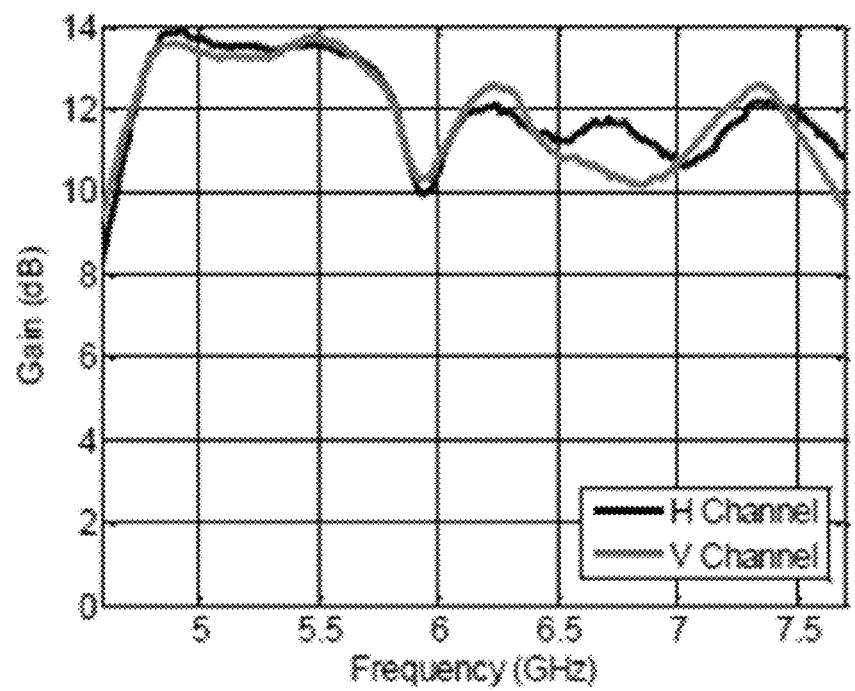
FIG. 16 is a graph showing the measured antenna gain.

The S-parameters of the antenna are illustrated in FIGS. 11A and 11B. Keeping the return loss better than 8 dB, a minimum isolation level of 50 dB is achieved over 44% fractional bandwidth. Excluding the scattering effect caused by the nearby objects through gating the transmission response between the two ports, the measured isolation is shown to be better than 55 dB. It should be noted that the isolation level between the two ports is simulated to be more than 89 dB which is degraded in measurement due to fabrication imperfects. Compared to the co-polarized antenna design, both the bandwidth and isolation are enhanced. The antenna radiation patterns in E- and H planes at different frequencies are plotted in FIG. 18. Other than the polarization, the transmitting and receiving patterns are of identical shape. The cross-polarization is less than −20 dB and the front-to-back ratio is better than 19 dB for both channels. The side-lobe levels are less than −16 dB in H-plane and less than −8 dB in E-plane for both polarizations. FIG. 16 depicts the measured antenna gains. The gain for both channels is more 10 dB over the entire bandwidth.

Figure 17:
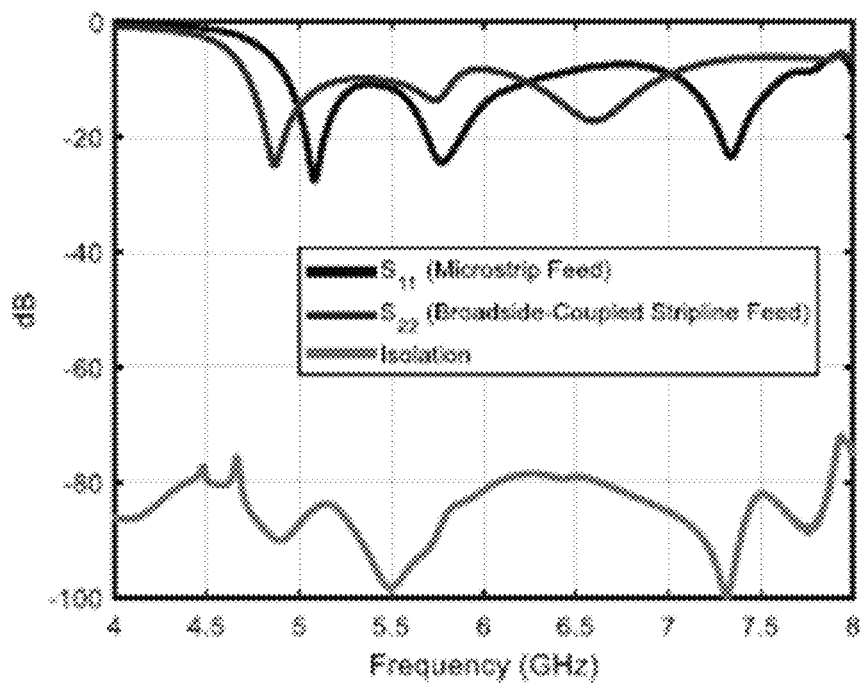
FIG. 17 is a graph showing the simulated S-parameters of the antenna structure shown in FIGS. 10A and 10B.

The antenna structure shown in FIGS. 10A and 10B is designed and simulated for the same bandwidth. The optimized values of the design parameters for the feed structure are listed in Table IV. The parallel stripline is printed on 60 mil RT/duroid 5880. The simulated S-parameters are plotted in FIG. 17. Keeping the dimensions almost the same as the former design, the port isolation is simulated to be 79 dB.

TABLE IV

The optimized values of the feed parameters shown in FIG. 13(a).

| Parameter | Value (MM) | Parameter | Value (mm) |
|---|---|---|---|
| $w_1$ | 7 | $l_1$ | 7.2 |
| $w_2$ | 10.4 | $l_2$ | 17.1 |
| $w_3$ | 25.4 | $l_3$ | 4.6 |
| $w_4$ | 2.6 | $l_4$ | 11 |
| $H_S$ | 1.5 | | |

A two-port common aperture CBSA array with two different feeding structures is presented that exhibits a very high isolation level between its ports. High isolation is achieved using orthogonal polarizations and utilizing a symmetric structure. A radiating aperture which results in higher gain for a given available area. A low-loss air-dielectric microstrip feed is designed which can be integrated with the other parts of the antenna and is amenable to 3D printing technology. The proposed decoupling method does not require any kind of hybrid and can potentially provide nearly 90 dB of channels isolation over 44% fractional bandwidth. For the fabricated antenna, a minimum of 55 dB self-interference cancellation is measured from 4.8 to 7.5 GHz.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A two-port cavity-backed slot antenna, comprising:
an antenna structure having shape of a cuboid and defining a cavity between two opposing planar surface;
a feed slot formed in a first of the two opposing planar surfaces of the antenna structure, the feed slot having shape of a cross and comprised of a transmit slot and a receive slot; and
four radiating slots and four receiving slots formed in a second of the two opposing planar surfaces of the antenna structure, where the four radiating slots and the four receiving slots are arranged symmetrically in relation to the feed slot.

2. The cavity-backed slot antenna of claim 1 wherein the four radiating slots and four receiving slots form four apertures each in shape of a cross, such that the arms of each cross have same dimensions.

3. The cavity-backed slot antenna of claim 2 wherein longitudinal dimension of each radiating slot is $\lambda/2$, where $\lambda$ corresponds to operating frequency of the antenna.

4. The cavity-backed slot antenna of claim 1 further comprises a microstrip configured to deliver a transmit signal to the transmit slot, wherein the microstrip includes two prongs symmetrically crossing over the transmit slot with one of the two prongs on each side of the receive slot.

5. The cavity-backed slot antenna of claim 4 wherein portions of the two prongs overlapping with the transmit slot are suspended in air and supported by four short circuited stubs.

6. The cavity-backed slot antenna of claim 1 further comprises a plurality of metal septa disposed in the cavity of the antenna structure and arranged along edges of the transmit slot and the receive slot.

7. The cavity-backed slot antenna of claim 4 further comprises additional metal septa disposed in corners of the cavity of the antenna structure and configured to generate a standing wave at higher frequencies of the operating bandwidth.

8. The cavity-backed slot antenna of claim 1 is configured to exhibit 44% fractional bandwidth.

9. A two-port cavity-backed slot antenna, comprising:
an antenna structure having shape of a cuboid and defining a cavity therein;
a feed slot formed in a first of two opposing planar surfaces of the antenna structure, the feed slot having shape of a cross and comprised of a transmit slot and a receive slot;
one or more radiating slots formed in a second of the two opposing planar surfaces of the antenna structure;
additional metal septa disposed in corners of the cavity of the antenna structure and configured to generate a standing wave at higher frequencies of the operating bandwidth; and
a microstrip configured to deliver a transmit signal to the transmit slot, wherein the microstrip includes two prongs symmetrically crossing over the transmit slot with one of the two prongs on each side of the receive slot.

10. The cavity-backed slot antenna of claim 9 wherein portions of the two prongs overlapping with the transmit slot are suspended in air.

11. The cavity-backed slot antenna of claim 9 further comprises a plurality of metal septa disposed in the cavity of the antenna structure and arranged along edges of the transmit slot and the receive slot.

12. The cavity-backed slot antenna of claim 9 wherein the one or more radiating slots are arranged symmetrically in relation to the feed slot.

13. The cavity-backed slot antenna of claim 9 wherein the one or more radiating slots are further defined as four radiating slot, each radiating slot in shape of a cross and the arms of each cross have same dimensions.

14. The cavity-backed slot antenna of claim 9 wherein the receive slot is connected to a reduced-height waveguide with metallic steps for transition to a coaxial connector.

15. The cavity-backed slot antenna of claim 9 wherein the receive slot is connected to a reduced-height waveguide with a bent transition to parallel strip line and a transition to a coaxial connector.

16. A two-port cavity-backed slot antenna, comprising:
an antenna structure having shape of a cuboid and defining a cavity therein;
a feed slot formed in a first of two opposing planar surfaces of the antenna structure, the feed slot having shape of a cross and comprised of a transmit slot and a receive slot;
four radiating slots formed in a second of the two opposing planar surfaces of the antenna structure and arranged symmetrically in relation to the feed slot, each radiating slot in shape of a cross and the arms of each cross have same dimensions; and
a microstrip configured to deliver a transmit signal to the transmit slot, wherein the microstrip includes two prongs symmetrically crossing over the transmit slot with one of the two prongs on each side of the receive slot.

17. The cavity-backed slot antenna of claim 16 wherein longitudinal dimension of each radiating slot is $\lambda/2$, where $\lambda$ corresponds to operating frequency of the antenna.

18. The cavity-backed slot antenna of claim 16 wherein portions of the two prongs overlapping with the transmit slot are suspended in air.

* * * * *